United States Patent
Knittel et al.

(10) Patent No.: US 8,179,767 B2
(45) Date of Patent: May 15, 2012

(54) DATA PAGE FOR USE IN A HOLOGRAPHIC DATA STORAGE SYSTEM

(75) Inventors: Joachim Knittel, Tuttlingen (DE); Frank Przygodda, Friedrichshafen (DE)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 12/736,245

(22) PCT Filed: Mar. 16, 2009

(86) PCT No.: PCT/EP2009/053037
§ 371 (c)(1),
(2), (4) Date: Sep. 22, 2010

(87) PCT Pub. No.: WO2009/121709
PCT Pub. Date: Oct. 8, 2009

(65) Prior Publication Data
US 2011/0007620 A1     Jan. 13, 2011

(30) Foreign Application Priority Data
Apr. 4, 2008   (EP) .................................... 08154080

(51) Int. Cl.
*G11B 7/00* (2006.01)
(52) U.S. Cl. ....................................... 369/103
(58) Field of Classification Search .................. 369/103; 359/3, 9–11, 21, 30–33
See application file for complete search history.

(56) References Cited

U.S. PATENT DOCUMENTS

| | | | |
|---|---|---|---|
| 4,037,918 A | 7/1977 | Kato | |
| 6,281,993 B1 | 8/2001 | Bernal et al. | |
| 7,130,092 B1 | 10/2006 | Horimai | |
| 7,830,572 B2 * | 11/2010 | Szarvas et al. | 359/11 |
| 2005/0180291 A1 * | 8/2005 | Ogasawara | 369/103 |
| 2008/0225671 A1 * | 9/2008 | Malki et al. | 369/103 |
| 2008/0231925 A1 * | 9/2008 | Tateishi et al. | 359/21 |
| 2010/0061213 A1 * | 3/2010 | Crompvoets et al. | 369/103 |

FOREIGN PATENT DOCUMENTS

EP    1324322    7/2003

* cited by examiner

*Primary Examiner* — Thang Tran
(74) *Attorney, Agent, or Firm* — Robert D. Shedd; Robert B. Levy; Jorge Tony Villabon (57) ABSTRACT

A data page for use in a holographic data storage system, and to a method and an apparatus for writing to holographic storage media using such a data page are described. The data page has dark zones for each boundary between phase blocks of a phase mask of the holographic data storage system, which consist of switched-off pixels that are not used for encoding data, and which coincide with the boundaries between the phase blocks.

8 Claims, 8 Drawing Sheets

DATA PAGE FOR USE IN A HOLOGRAPHIC DATA STORAGE SYSTEM

This application claims the benefit, under 35 U.S.C. §365 of International Application PCT/EP2009/053037, filed Mar. 16, 2009, which was published in accordance with PCT Article 21(2) on Oct. 8, 2009 in English and which claims the benefit of European patent application No. 08154080.9, filed Apr. 4, 2008.

The present invention relates to a data page for use in a holographic data storage system, and to a method and an apparatus for writing to holographic storage media using such a data page.

In holographic data storage digital data are stored by recording the interference pattern produced by the superposition of two coherent laser beams, where one beam, the so-called 'object beam', is modulated by a spatial light modulator (SLM) and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator and detected with an array detector.

As described above, in page-oriented holographic data storage a pixelated spatial light modulator is used for modulating the object beam intensity with information. This intensity distribution is usually Fourier transformed by an objective lens. The Fourier transform, i.e. the spectrum of a pixelated data pattern, has a high central intensity peak, hereafter referred to as DC peak. The actual information is distributed around this peak on a much lower level, typically −60 dB. The DC peak of the object beam can cause an undesired saturation of the photosensitive medium. The envelope of the surrounding intensity distribution can be described by a 2-dimensional sinc-function $(\sin(x)/x)$, which results from the usual square-like shape of the pixels. The full information about the SLM pixel pattern is located below the so-called Nyquist limit which lies at half the distance to the first zero of the sinc-function.

In order to suppress the DC-peak it has been proposed to apply a phase modulation in addition to the intensity modulation. For example, in Tanaka et al.: "*Improved performance in coaxial holographic data recording*", Opt. Expr. 15 (2007), pp. 16196-16209 use of a random binary phase mask for suppression of the DC peak is described. The random binary phase mask has a pixel pitch identical to the pixel pitch of the SLM.

A drawback of using phase masks is that in general the phase masks need to be aligned to better than ±10% of the pixel width of the SLM. The pixel width is typical 10 µm, so that the alignment tolerances are only ±1 µm in the x- and y-direction perpendicular to the object beam. Misalignment of the phase mask with respect to the data page pixels leads to disturbances in the recorded data page. The disturbances are caused by the transition zones between those areas of the phase mask with different phase, i.e. by phase jumps of the phase mask. The disturbances in the recorded data page decrease the reliability of the data detection and, therefore, increase the error rate.

It is an object of the invention to propose a data page for use in a holographic data storage system, which enables an increased alignment tolerance.

According to the invention, this object is achieved by a data page for use in a holographic data storage system with a phase mask having a plurality of phase blocks, wherein the data page has dark zones for each boundary between the phase blocks, which consist of switched-off pixels that are not used for encoding data, and which coincide with the boundaries between the phase blocks of the phase mask.

Similarly, in an apparatus for writing to holographic storage media, with a spatial light modulator for imprinting a data page onto an object beam, and with a phase mask having a plurality of phase blocks, the data page has dark zones for each boundary between the phase blocks, which consist of switched-off pixels that are not used for encoding data, and which coincide with the boundaries between the phase blocks of the phase mask.

Likewise, a method for writing to holographic storage media in a holographic storage system includes the steps of imprinting a data page onto an object beam with a spatial light modulator, the data page having dark zones for each boundary between the phase blocks, which consist of switched-off pixels that are not used for encoding data, and which are chosen such that they coincide with the boundaries between the phase blocks of a phase mask of the holographic storage system.

By providing the data page with dark zones, which coincide with the boundaries of the phase blocks of the phase mask, the alignment tolerances for the phase mask are significantly increased. No additional components are necessary for this purpose, which allows for an easy and cheap implementation of the invention. Though the dark zones slightly reduce the data capacity per data page, this reduction can be reduced to a minimum by using the dark lines as sync marks for data detection.

Preferably, the data page has data areas with a fixed block size or a variable block size. The choice between a fixed block size or a variable block size allows to implement different data coding schemes.

Advantageously, the phase mask is a binary phase mask or a grey level phase mask. The choice of a specific type of phase mask depends, inter alia, on the type of holographic storage system and the desired suppression of the DC peak.

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

Figure 1:
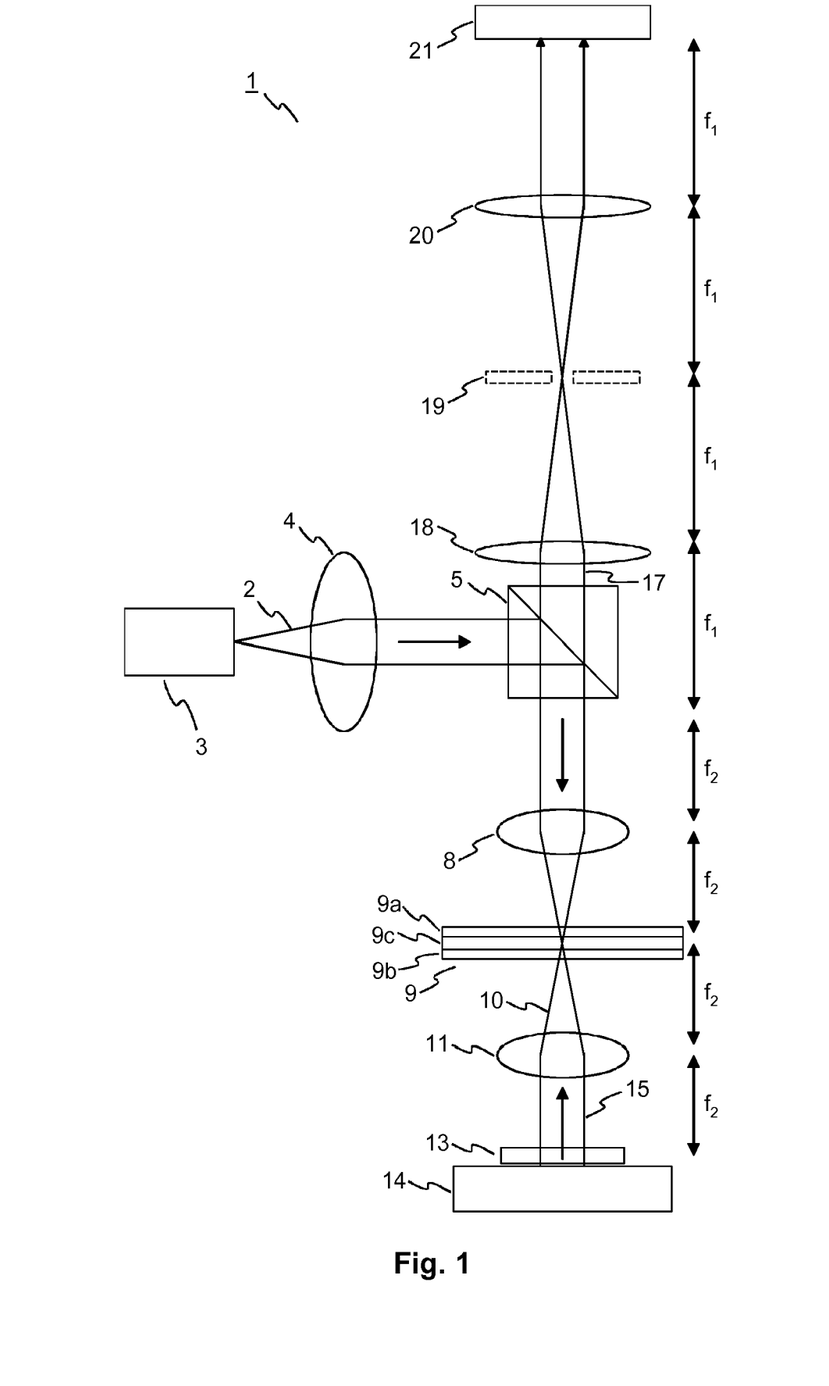
FIG. 1 schematically depicts a known reflection type collinear holographic storage system.

FIG. 1 schematically depicts a known reflection type collinear holographic storage system 1. A laser beam 2 emitted by laser 3 and collimated by a lens 4 is deviated by a non-polarizing beam splitter 5 towards an objective lens 8, which focuses the beam into a holographic storage medium 9. The holographic storage medium has two cover layers 9a, 9b and a hologram layer 9c. A transmitted beam 10 is collimated by a further objective lens 11 and sent through a binary phase plate 13 onto a reflective spatial light modulator (SLM) 14. The pixels of the SLM 14 can be switched between a reflective state and a transmissive or absorptive state. The SLM 14 reflects part 15 of the incident light beam 10 back towards the holographic storage medium 9. The binary phase plate 13 is pixel matched with the SLM 14 and reduces the Fourier peak of the reflected beam 15. The light beam 2 that goes from the non-polarizing beam splitter 5 towards the holographic storage medium 9 is the reference beam, whereas the light beam 15 reflected by the reflective SLM 14 towards the holographic storage medium 9 is the object beam. The reflective SLM 14 is used to imprint the data onto the wave front of the object beam 15. The two beams 2, 15 interfere within the holographic storage medium 9 and create a hologram.

For readout the reflective SLM 14 is switched in such a way that no light coming from laser 3 is reflected towards the holographic storage medium 9. The holographic storage medium 9 is illuminated by the light beam 2 emitted by the laser 3 via the objective lens 8. The hologram recorded in the holographic storage medium 9 reflects part of the incident light beam 2, the reconstructed object beam 17, which corresponds to the stored data page. On the return path towards an array detector 21 the reconstructed object beam 17 passes through the non-polarizing beam splitter 5. Optionally, a Fourier filter 19 is introduced between two lenses 18 and 20 forming a 4f imaging system. The Fourier filter 19 allows to cancel high-frequency components generated by the binary phase plate 13. This is especially useful if the binary phase plate 13 is a phase plate consisting of individual pixels.

Figure 2:
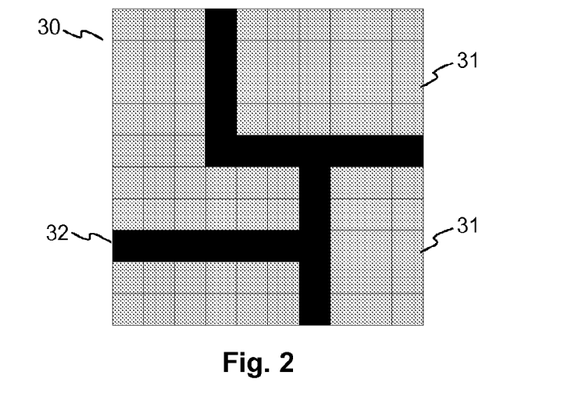
FIG. 2 depicts a data page according to the invention.

A data page 30 according to the invention is depicted in FIG. 2. The data page 30 consists of data areas 31 and a pattern of dark zones 32, where the object beam is always switched off and the data page 30 is dark. In the figure, the dark zones 32 are lines with a width of one pixel. Of course, the lines can likewise have a width of more then one pixel. The dark zones 32 of the data page 30 are adapted to the phase pattern of the phase mask 13, as will be explained in the following with reference to FIGS. 3 and 4.

Figure 3:
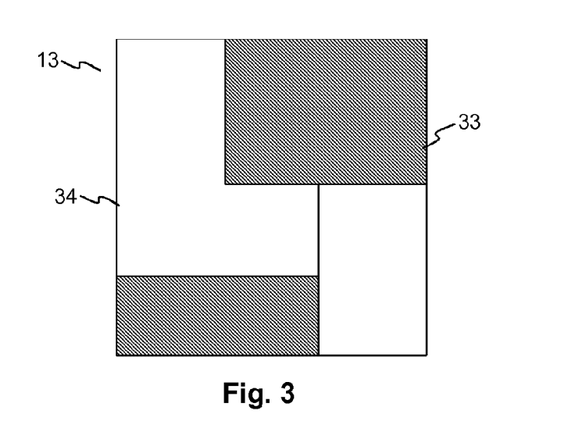
FIG. 3 shows a phase mask to which the data page of FIG. 2 is adapted.

FIG. 3 shows the phase mask 13 to which the data page of FIG. 2 is adapted. In this example a binary phase plate 13 is used. Of course, the basic idea is also applicable to multilevel phase masks or any other phase mask with phase jumps. The phase mask 13 has phase blocks 33, 34 with a constant phase. In the figure, the dark grey phase blocks 33 denote a phase shift of π, whereas the white phase blocks 34 denote a phase shift of 0.

Figure 4:
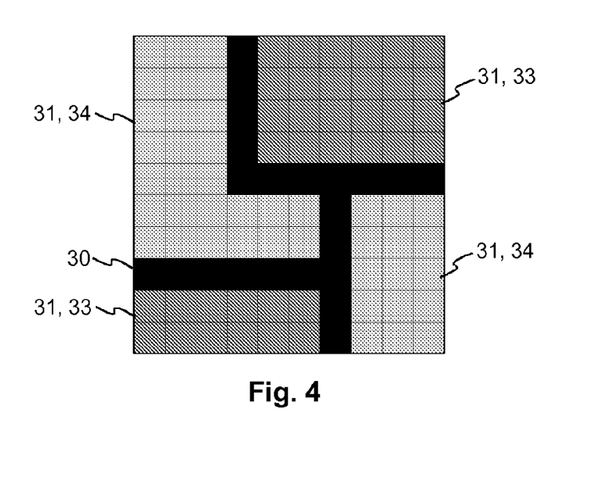
FIG. 4 illustrates the superposition of the data page of FIG. 2 and the phase mask of FIG. 3.

The superposition of the data page of FIG. 2 and the phase mask of FIG. 3 is illustrated in FIG. 4. As can be seen, the transition zones between the phase blocks 33, 34 of the phase mask 13, where the phase shift changes from π to 0, coincides with the center of the dark zones 32 of the data page 30. In this way the alignment tolerances are relaxed by an additional term of ±0.5 times the width of a pixel, or even more when the width of the lines of the dark zones 32 is more than one pixel.

Figure 5:
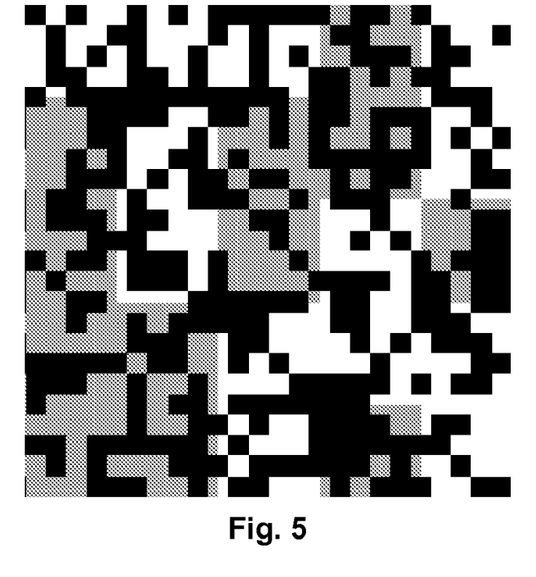
FIG. 5 shows the misaligned superposition of a conventional data page and a phase mask.
Figure 6:
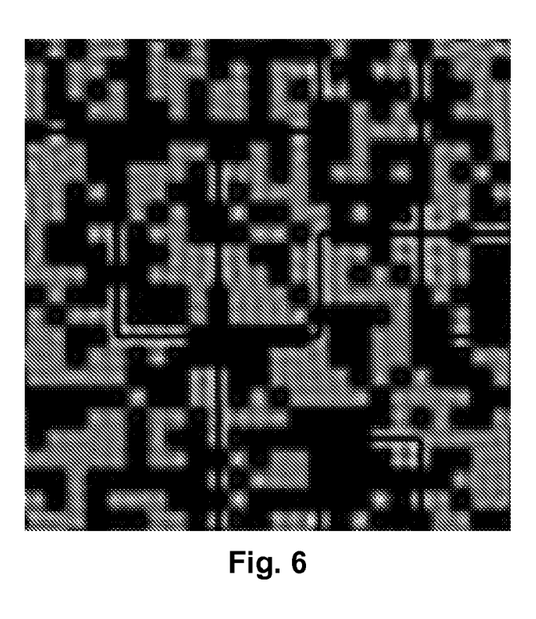
FIG. 6 depicts the appearance of the retrieved data page on the detector.

FIGS. 5 and 6 demonstrate the effects of a misalignment of the phase mask 13 with respect to the data page pixels in case of a conventional data page. FIG. 5 shows the superposition of the data page 30 and the phase mask 13. The pattern of small black and white pixels is the data page 30 generated by the SLM 14. The pattern of large grey and white blocks is the phase pattern generated by the phase mask. The phase mask 13 introduces a constant phase shift of π or 0 in phase blocks with a size of 5×5 pixels. The phase mask is misaligned by 0.5 pixels with respect to the data pixels.

FIG. 6 depicts the appearance of the retrieved data page on the detector 21. As can be seen dark lines crossing the data blocks are produced by the transition zones between the phase blocks. These lines decrease the reliability of the data detection and cause an increased the error rate.

Figure 7:
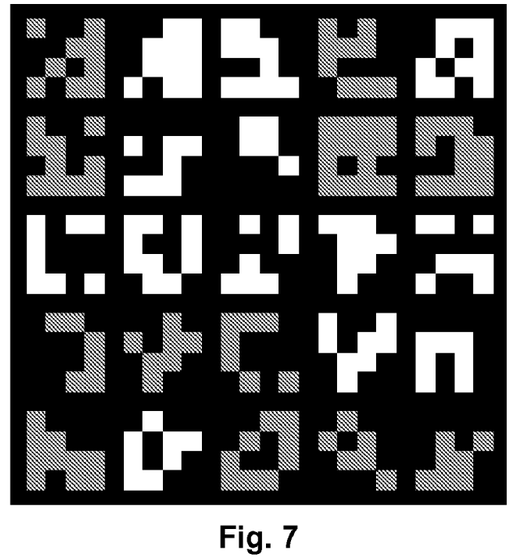
FIG. 7 shows the misaligned superposition of a data page according to the invention and a phase mask.
Figure 8:
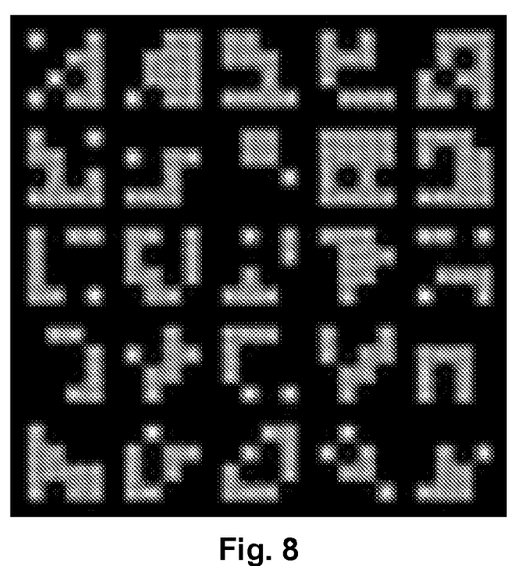
FIG. 8 depicts the appearance of the retrieved data page on the detector.

FIGS. 7 and 8 demonstrate the effects of a misalignment of the phase mask 13 with respect to the data page pixels in case of a data page 30 according to the invention. As before, FIG. 7 shows the superposition of the data page 30 and the phase mask 13. The same phase mask with the same misalignment as in FIGS. 5 and 6 is used. In this example the data page 30 consists of 4×4 pixel blocks separated by a gap of one pixel.

FIG. 8 depicts the appearance of the retrieved data page on the detector 21. Apparently, with a data page 30 according to the invention the data blocks are imaged without any disturbance by the phase shifts.

Figure 9:
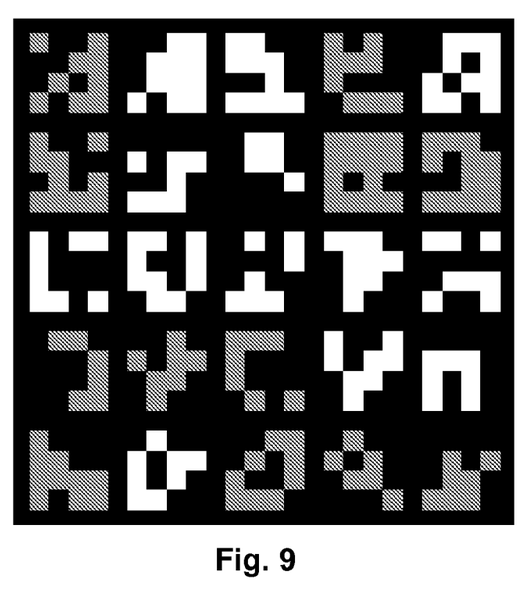
FIG. 9 shows the aligned superposition of a data page according to the invention and a phase mask.
Figure 10:
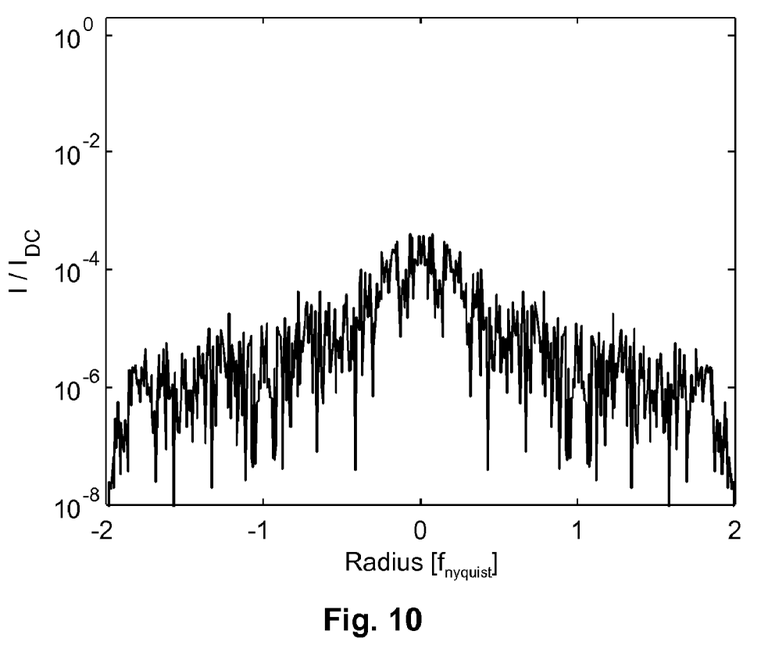
FIG. 10 depicts the resulting suppression of the DC peak.

The suppression of the DC peak in the Fourier holograms, which is achieved by the phase mask 13 in combination with the data page 30 according to the invention, is illustrated in FIGS. 9 and 10.

The exemplary data page 30 depicted in FIG. 9 consists of 4×4 pixel blocks separated by a gap of one pixel. The phase mask 13 introduces a constant phase shift of π or 0 in phase blocks with a size of 5×5 pixels. The phase mask is correctly aligned with respect to the data pixels.

FIG. 10 depicts a cut through the simulated intensity distribution of the resulting Fourier hologram. As can be seen the typical DC peak of Fourier holograms does not appear. For an optimum suppression of the DC peak the number of phase blocks 33 with a phase shift of π should be approximately the same as the number of phase blocks 34 with a phase shift of 0.

Figure 11:
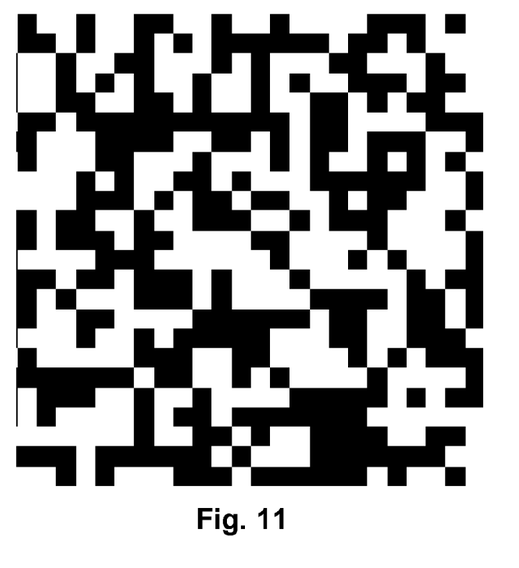
FIG. 11 shows a conventional data page without any phase mask.
Figure 12:
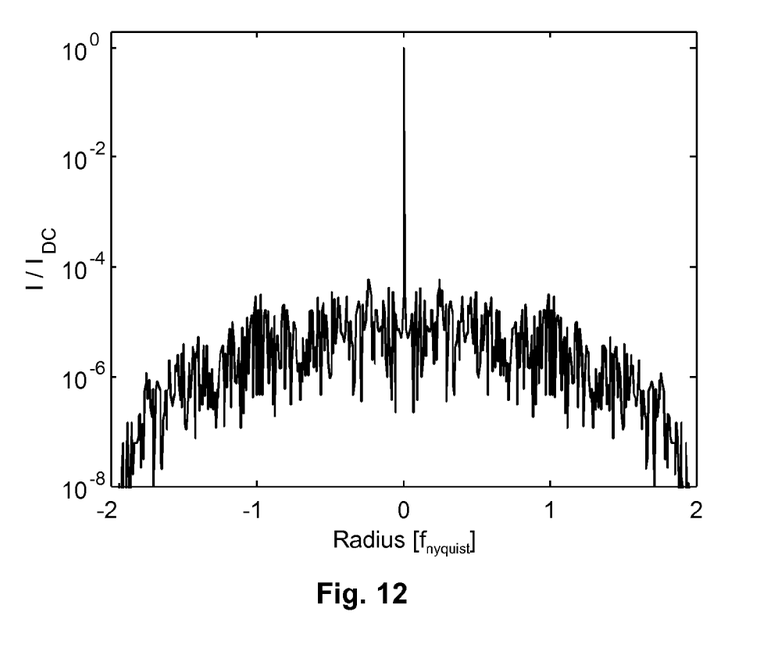
FIG. 12 depicts the resulting DC peak in the intensity distribution.

For comparison the case of a conventional data page without any phase plate is illustrated in FIGS. 11 and 12. FIG. 11 depicts the data page, FIG. 12 the cut through the simulated intensity distribution of the resulting Fourier hologram. The DC peak is present and exceeds the level of those components carrying information by orders of magnitude.

Figure 13:
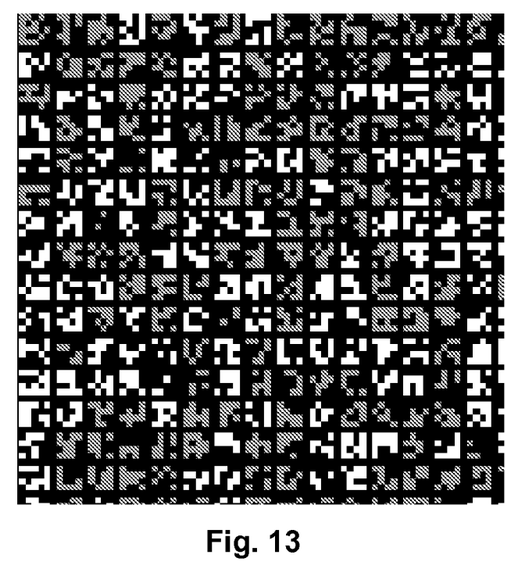
FIG. 13 shows a data page with 4×4 pixel blocks separated by a gap of one pixel.
Figure 14:
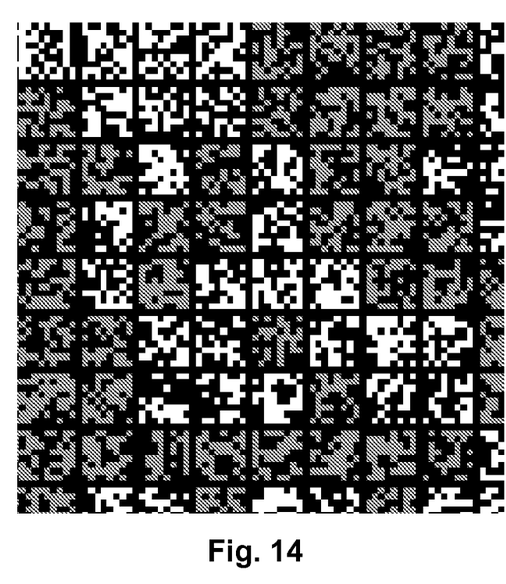
FIG. 14 shows a data page with 8×8 pixel blocks separated by a gap of one pixel.
Figure 15:
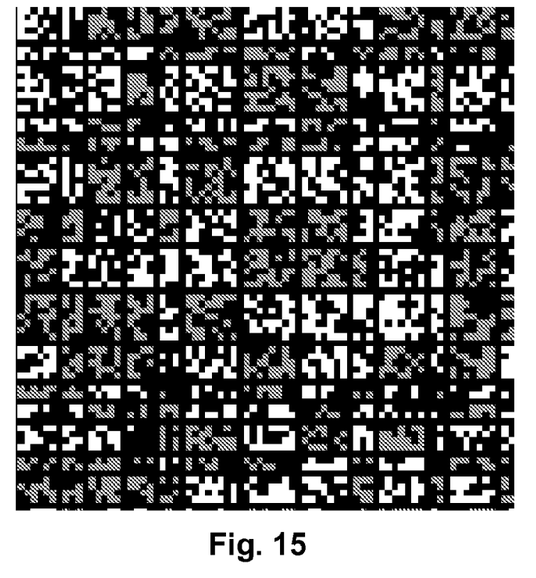
FIG. 15 illustrates a data page with pixel blocks of a variable block size separated by a gap of one pixel.
Figure 16:
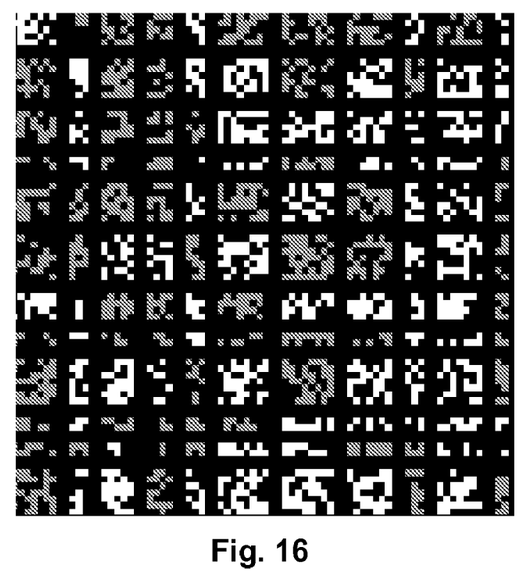
FIG. 16 depicts a data page with pixel blocks of a variable block size separated by a gap of two pixels.

In FIG. 13 to 16 different examples of data pages 30 according to the invention are illustrated. In the figures the superposition of the data page 30 and the phase mask 13 are shown. FIG. 13 depicts a data page with 4×4 pixel blocks separated by a gap of one pixel. FIG. 14 shows a data page with 8×8 pixel blocks separated by a gap of one pixel. A data page with pixel blocks of a variable block size separated by a gap of one pixel is illustrated in FIG. 15. Finally, FIG. 16 shows a data page with pixel blocks of a variable block size separated by a gap of two pixels.

The invention claimed is:

1. A data page for use in a holographic data storage system with a phase mask comprising:
   a plurality of phase blocks, wherein the data page comprises dark zones for each boundary between the phase blocks, which consist of switched-off pixels that are not used for encoding data, and which coincide with the boundaries between the phase blocks.

2. The data page according to claim 1, wherein the data page comprises data areas with a fixed block size or a variable block size.

3. The data page according to claim 1, wherein the dark zones serve as sync marks.

4. An apparatus for recording a hologram in a holographic storage medium, the apparatus comprising:
   a phase mask comprising a plurality of phase blocks;
   a spatial light modulator for imprinting a data page onto an object beam;
   wherein the data page comprises has dark zones for each boundary between the phase blocks, which consist of switched-off pixels that are not used for encoding data, and which coincide with the boundaries between the phase blocks; and
   a recording head for recording a hologram corresponding to the data page imprinted onto the object beam by the spatial light modulator in the holographic storage medium.

5. The apparatus according to claim 4, wherein the data page comprises has data areas with a fixed block size or a variable block size.

6. The apparatus according to claim 4, wherein the dark zones serve as sync marks.

7. The apparatus according to claim 4, wherein the phase mask is a binary phase mask or a grey level phase mask.

8. A method for recording a hologram in a holographic storage medium in a holographic storage system comprising a phase mask with a plurality of phase blocks, the method comprising the steps of:
   generating a data page comprising dark zones for each boundary between the phase blocks, which consist of switched-off pixels that are not used for encoding data, and which are chosen such that they coincide with the boundaries between the phase blocks;
   imprinting the generated data page onto an object beam with a spatial light modulator; and
   recording a hologram corresponding to the generated data page to in the holographic storage medium.

\* \* \* \* \*